3,423,994
TESTING APPARATUS
Ronald F. Scott, Altadena, Hon Yim Ko., Pasadena, and Boris Auksmann, San Gabriel, Calif., assignors to California Institute Research Foundation, Pasadena, Calif., a corporation of California
Filed Apr. 18, 1966, Ser. No. 543,297
U.S. Cl. 73—94                            15 Claims
Int. Cl. B30b 7/04; G01n 3/10

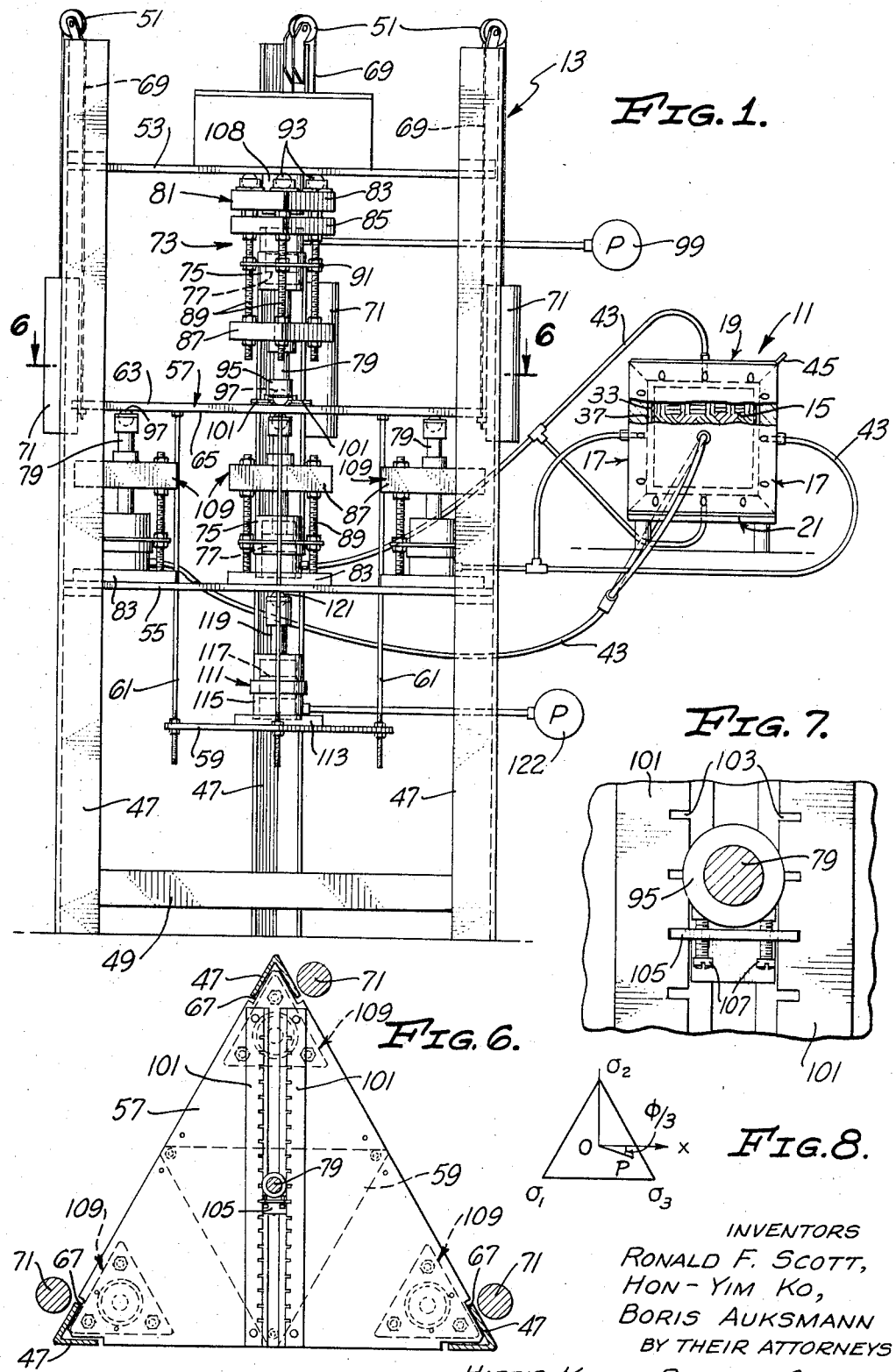

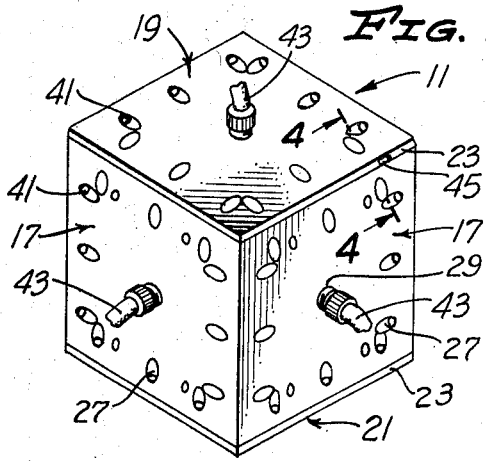
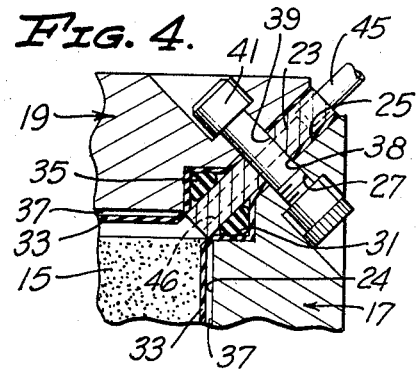
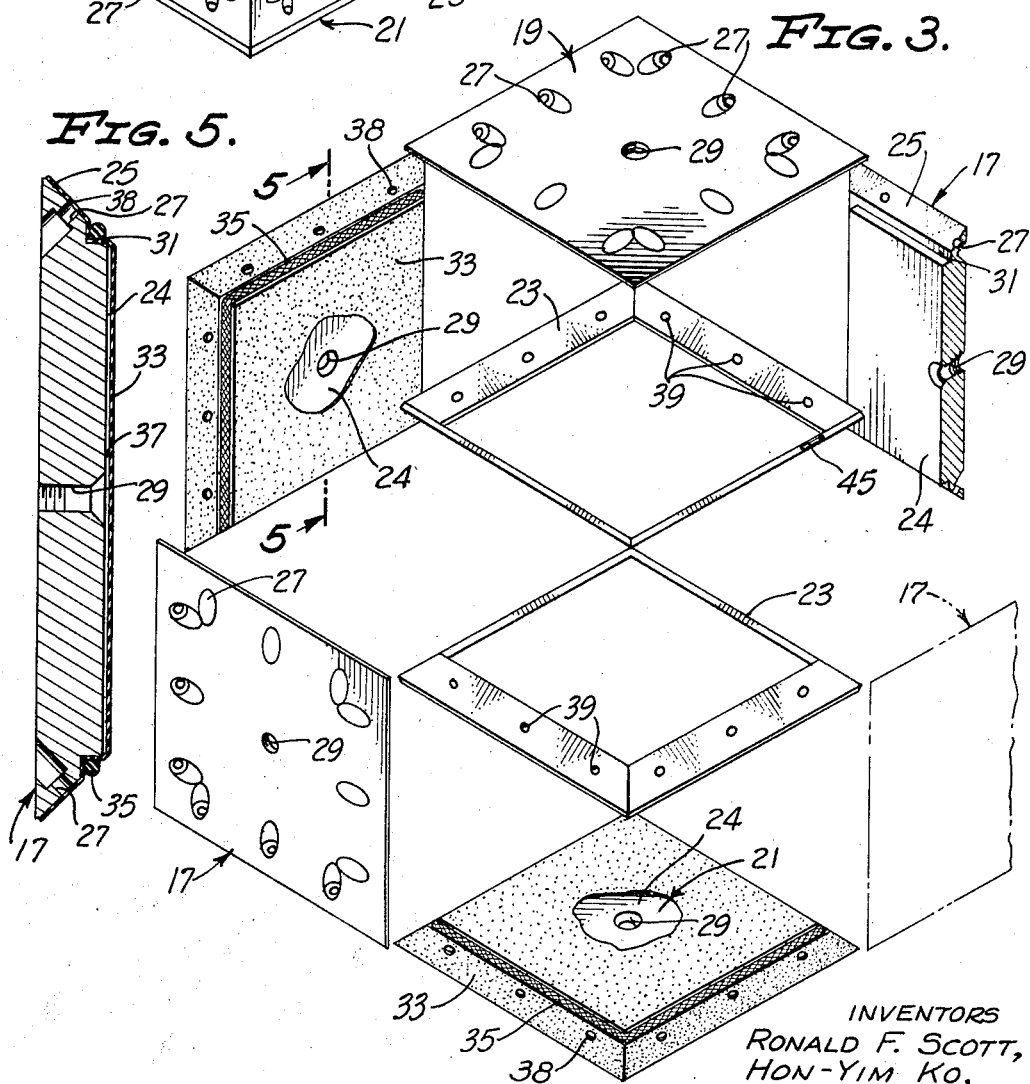
INVENTORS
RONALD F. SCOTT,
HON-YIM KO,
BORIS AUKSMANN
BY THEIR ATTORNEYS
HARRIS, KIECH, RUSSELL & KERN United States Patent Office 3,423,994
Patented Jan. 28, 1969

ABSTRACT OF THE DISCLOSURE

Apparatus for producing three forces for use with a three axis compression test chamber or the like. A force distribution system for producing three forces of variable magnitude and variable relative magnitude, with a single input force applied at a single location. Means for varying the magnitude of and point of application of the input force. Use of the apparatus as an analog computer.

---

This invention relates to a novel testing apparatus and more paricularly to a stress control device and testing container, the latter being operable in response to several outputs from the former. Although the stress control device is particularly suitable for use with the testing container, it will be readily apparent that the stress control device is adaptable to other uses. The testing container is described herein with reference to the testing of a soil sample; however, this testing container may be used in the pressure testing of various materials.

Many testing devices, including the testing device described herein, may require several variable input stresses or forces in their operation. For example, in the testing of soil with the device described herein it is desirable to have three input stresses of different and variable magnitudes to properly test some soil specimens. The input stress is preferably developed by a fluid under pressure.

Accordingly, an object of this invention is to divide an applied force or stress into at least three variable outputs by applying such force or stress to various preselected points of a load-distributing member.

A primary object of this invention is to provide a stress control device which supplies several output forces for use in various tests and also functions as an analog computer. Thus, the device is particularly useful in simultaneously supplying several stresses to a soil-testing device and in calculating the magnitude of such stresses.

Another object of this invention is to provide a stress control device which includes a load distribution plate, means for applying a movable load to the plate, and supporting units for supporting the load distribution plate, the points of engagement between the supporting units and the load distribution plate being arranged or disaligned to provide support for the load distribution plate at least at three laterally disaligned points, each of the supporting units including output means for producing an output pressure which is variable in response to the amount of load carried by its respective supporting unit.

A further object of this invention is to utilize guide means on the load distribution plate for accurately positioning the force-applying means relative thereto.

Another object of this invention is to provide a stress control device having a triangular load distribution plate and three generally vertical guide posts for mounting the load distribution plate for movement therealong.

Still another object of this invention is to provide a support plate disposed beneath the load distribution plate for supporting the supporting units.

Another object of this invention is to utilize the stress control device to provide fluid under pressure for operating a testing device.

The invention, both as to its organization and method of operation, together with further objects and advantages thereof, may best be understood by reference to the following description taken in connection with the accompanying drawings in which:

FIG. 1 is a front elevational view partially in section of a preferred embodiment of the testing apparatus of this invention;

FIG. 2 is an isometric view of the testing container;

FIG. 3 is an enalrged exploded isometric view partially in section of the testing container, the central portions of two of the diaphragms being broken away to expose the fluid-admitting apertures;

FIG. 4 is an enlarged fragmentary sectional view taken along line 4—4 in FIG. 2 and showing the manner in which the adjacent segments of the testing container are secured together;

FIG. 5 is an enlarged sectional view taken along line 5—5 in FIG. 3 and showing the chamber formed by one of the plate-like segments and its associated diaphragms;

FIG. 6 is a sectional view taken along line 6—6 in FIG. 1 and illustrating the load distribution member and the associated guide elements of the stress control device;

FIG. 7 is an enlarged fragmentary plan view showing the guide elements and the force-applying member of the stress control device; and FIG. 8 is a diagrammatic plan view of the load distribution plate showing how the device can be used as a computer.

Referring to the drawings and in particular to FIG. 1 thereof, a testing device or testing apparatus 11 is illustrated as being operatively connected to a stress control device 13. FIG. 1 illustrates the testing device 11 with parts thereof broken away to expose a test specimen such as a soil sample 15.

The details of the testing device 11 are best seen in FIGS. 2–5. Generally, the testing device 11 includes four plate-like side segments 17, a plate-like top segment 19, a plate-like bottom segment 21, and upper and lower peripheral or annular frames or segments 23. These segments are secured together as indicated in FIGS. 2–4 to form a substantially fluid-tight body. During construction, the frames 21 and 23 hold the four side plates 17 firmly together in correct alignment before the top and bottom plates 19 and 21 are added.

The segments 17, 19 and 21 are all substantially preferably identical, and accordingly only one of them is described in detail. The top and bottom segments 19 and 21 are slightly smaller than the side segments 17 because of the presence of the frames 21 and 23. The side segments 17 are preferably strong square metal plates having interior wall surfaces 24 with peripheral beveled edges 25. A plurality of bolt holes 27 is arranged around each segment 17 to permit attachment of the segments to each other. A threaded fluid-admitting aperture 29 is located centrally in each segment 17 and provides means for admitting fluid under pressure to the interior of the testing device 11. An annular groove 31 is formed in the beveled edge 25.

The segments 17, 19, and 21 are provided with identical pressure-responsive members or resilient diaphragms 33 of sheet rubber, a metal or a flexible material overlying the beveled edges 25 and the interior wall surfaces 24. A resilient band 35 holds a portion of each of the diaphragms 33 in the annular groove 31. As best seen in FIG. 5, the diaphragm 33 is movable away from at least a portion of the interior wall surface 24 to form a chamber 37 which is placed in communication with the exterior of the testing device 11 by the fluid-admitting aperture 29.

Although the diaphragm 33 may contact the interior wall surface 24 when there is no fluid pressure acting thereon, it is necessary that the chamber 37 be formable at least in response to fluid under pressure so that such fluid can exert even pressure over the entire adjacent face of the test specimen. Holes 38 axially aligned with the hole 27 are provided in the diaphragm 33.

The frames 23 are sized and shaped to rest on the beveled edges 25 of the segments 17. The segments 19 and 21 in turn rest on the upper and lower surfaces, respectively, of the upper and lower frames 23. The frames 23 have a plurality of bolt holes 39 arranged to cooperate with the bolt holes 27 in the segments 17, 19, and 21.

The testing device 11 is bolted together by a plurality of bolts 41 as indicated in FIGS. 1, 2, and 4. The side segments 17 are bolted together with their respective resilient diaphragms 33 being held together in abutting relationship. The upper frame 23 rests on the upwardly facing portions of the beveled edges 25 of the side segments 17 as indicated in FIG. 4. Thus, the upper frame 23 separates the adjacent resilient diaphragms 33. In either event, however, the diaphragms 33 are clamped against the beveled edges of their respective segments by the adjacent segments 17, 19, and 21 and form a fluid-tight seal. Thus, six of the fluid-tight chambers 37 are formed, one for each of the segments 17, 19 and 21. The internal wall surfaces 24 of the segments form a cubical cavity and the portion of such cavity exclusive of the chambers 37 defines a specimen-receiving space for receiving the sample 15 of soil or other material.

In use of the device, the top segment 19 may be removed, the soil or other sample 15 deposited in the sample-receiving space, and the top segment 19 securely bolted to the side segments 17 through the frame 23. Fluid supply lines 43 may then be connected to each of the apertures 29. As shown in FIG. 1, these supply lines 43 are preferably secured to the stress control device of this invention; however, other sources of fluid pressure may be employed. By appropriate operation of the stress control device 13 or other suitable source of fluid under pressure, fluid pressure is applied through the lines 43 and the aperture 29 to each of the chambers 37 to apply compressive forces to the test specimen 15. If the fluid is applied under sufficient pressure and the test specimen is compressible, the chambers 37 will enlarge, forcing the diaphragms 33 inwardly to reduce the volume of the specimen. Depending upon the test being conducted, equal or different pressures may be admitted to the three sets or pairs of the chambers 37. Although the cavity in the soil testing box is preferably cubical and formed by the three pairs of opposed wall surfaces 24, other shapes may be employed if desired.

When the test specimen 15 contains air or water in the void spaces between the soil grains, the volume changes in the specimen may be observed by measuring the amount of air or water which enters or leaves the sample. Provision for the ingress or egress of air or water is made by connecting a line 45 to an aperture 46 in the upper frame 23 leading to the specimen-receiving space.

If desired, volume changes in a sample during a test may be prevented, in which case pressures develop in the air or water in the soil voids. The line 45 may be removed and a pressure gage (not shown) may be secured in the aperture 46 to provide readings on the pressure within the specimen 15.

Turning again to FIG. 1, it will be seen that the preferred form of stress control device 13 includes three generally vertical guide posts 47 suitably interconnected by a plurality of lateral braces 49. Each of the posts 47 is preferably formed of angle iron and carries a pulley 51 at the upper end thereof. Preferably the posts are equally spaced and arranged to form an equilateral triangle as shown in FIG. 6.

An upper end plate 53 and a support plate 55 are rigidly secured to the three posts 47. A load distribution plate 57 is mounted between the posts 47 for movement intermediate the upper end plate 53 and the support plate 55. An additional load plate or mounting member 59 is attached to the load distribution plate 57 by three rods 61. Preferably all of the plates are equilateral triangles whose planes are parallel and the mounting plate 59 is conveniently of lesser area than the other three plates as illustrated in FIG. 1.

The load distribution plate 57 is generally flat and has an upper face 63 and a lower face 65. The portions of the plate 57 adjacent the three apices thereof have notches 67 which are slidably received within the angle of the posts 47. Thus, the posts 47 guide or slidably mount the load distribution plate 57 for movement of the apices along paths which are parallel to the posts 47. Each apex may move a different amount depending upon the manner in which the load distribution plate 57 is supported. The load distribution plate 57 is suspended by three cables 69 which are secured to this plate adjacent the apices thereof and extend over the pulleys 51 where they are fastened to three counterweights 71. The weight of the counterweights 71 is equal to the weight of the load distribution plate 57 plus the weights of all members secured thereto or supported thereby. Thus, the load distribution plate 57 floats freely and moves vertically in response to a very small force..

Fluid-operated force-applying means 73 is provided to exert a downwardly directed force on the upper face 63 of the load distribution plate 57. The force-applying means 73 includes a cylinder 75, a piston 77 slidably mounted in the cylinder, and a force-applying member or rod 79 secured to the piston and movable therewith. The cylinder 75 is rigidly secured to a mounting structure 81 which includes an upper disc 83, an intermediate disc 85, and a bearing or retaining plate 87, all of which are secured together by three threaded rods 89. The intermediate disc 85 engages the cylinder 75 to prevent upward or lateral movement thereof and a retaining member 91 secured to the rods 89 engages beneath a shoulder on the cylinder to prevent downward or lateral movement thereof. The mounting structure 81 also includes three ball members 93 which are freely rotatable and engage the lower surface of the upper end plate 53.

The rod 79 is slidably axially in the bearing 87 and is provided with a collar 95 carrying a roller 97 which is in engagement with the upper face 63 of the load distribution member 57. A fluid source, such as a pump 99, provides fluid under pressure to the cylinder 75 to cause downward movement of the piston 77 and the rod 79 to exert a downward force on the load distribution plate 57.

For a reason which will be more fully set forth hereinafter, it is desirable to accurately establish the point on the upper surface 63 of the load distribution plate 57 at which the downwardly directed force will be applied. By way of illustration, two spaced parallel guide tracks 101 are rigidly secured to the upper face 63 and receive the roller 97 therebetween. Each of the guide tracks 101 has a plurality of inwardly facing rectangular notches 103 (FIG. 7) which are adapted to releasably retain a positioning member 105. Two screws 107 are provided in the positioning member 105 and engage the collar 95. Thus, the tracks 101 establish a line along which the downwardly directed force will be applied and the notches 103, the positioning member 105 and the screws 107 establish the point on that line where the force will be applied. Of course, the tracks 101 may be moved to any desired known position along the plate 57, the notches 103 are accurately spaced and calibrated, and the screws 107 may also be calibrated so that the precise point at which the force is applied may be ascertained. For special test purposes the tracks 103 may be constructed so that the load-applying means 73 is constrained to move along a curved, rather than a straight, path. For example, the force-applying means may be secured to a radius arm (not shown) pivotally secured to the center of the plate 57.

When the force-applying means 73 applies a force to the load distribution plate 57 at a point spaced from the centroid thereof, the load distribution plate will tip slightly from the horizontal and will no longer be parallel to the upper end pate 53. To prevent movement of the force-applying means 73 along the plate 53 under these and other conditions, an electromagnet 108 is mounted on the mounting structure 81. The electromagnet is engageable with the plate 53 (FIG. 1) to prevent movement therebetween when the electromagnet is energized.

A plurality of support or output units 109, three being shown, are sandwiched between the support plate 55 and the load distribution plate 57 for the purpose of supporting the latter and transmitting loads in the form of pressures to the test box 11. Each of the support units 109 is identical to the force-applying means 73 except that the support unit has no intermediate disc 85 and does not have the ball members 93. Also the support units 109 are inverted relative to the force-applying means 73. Corresponding parts of the force-applying means 73 and the support units 109 are designated by corresponding reference numerals.

In the apparatus shown the discs 83 and the bearing plates 87 of the support units 109 preferably have triangular exteriors so that they may be received within the angles or V's of the support posts 47. The rollers 97 of the support units 109 extend upwardly and engage in small recesses (not shown) in the lower face 65 of the plate 57. Preferably, the discs 83 of each of the support units 109 are rigidly secured to the support plate 55 so that an equilateral triangle is formed.

The cylinder 75 and the piston 77 of each of the support units 109 define output means for providing fluid under pressure through the lines 43 to an external apparatus such as the soil testing device 11. The rod 79 of each of the supporting units 109 acts on the piston secured thereto causing the latter to exert force on a fluid carried within the cylinder 75 to produce a pressurized fluid output. The amount of force delivered by each of the output means varies in response to the amount of load carried by its respective supporting unit. Various kinds of output means may be used.

The amount of load carried by each of the supporting units 109 and hence the amount of force delivered by each of the output means may be varied by movement of the force-applying means 73. It is preferred that the points of engagement between the supporting units 109 and the load distribution plate 57 be disaligned to provide support for the load distribution plate at least at three laterally disaligned points. In the embodiment illustrated, such laterally disaligned points lie closely adjacent the apices of the plate 57 and are arranged to form an equilateral triangle. The load distribution member 57 acts to distribute the load between the three supporting units 109. By moving the force-applying means 73 to known predetermined positions on the load distribution plate 57, the input force supplied by the force-applying means may be divided in a way determined by their geometrical arrangement. The force-applying means 73 can apply various input forces to the load distribution member 57 depending upon the pressure of the fluid supplied to the upper face of the piston 75 thereof by the pump 99.

As shown in FIG. 1, the supporting units 109 supply fluid under pressure through lines 43 to opposed sides of the soil testing device. Thus, equal pressures are supplied to each pair of opposite faces of the cubical soil sample 15. By moving the force-applying means 73, the pressures or stresses applied to the soil specimen 15 may be varied in a manner determined by the geometrical arrangement of the supporting units 109. For example, the force-applying means may be moved so that the pressure applied to the upper and lower faces of the test specimen 15 exceeds the pressure applied to thte sides of the test specimen. Of course, an infinite number of combinations of pressures is possible. Usually the forces applied to a pair of opposed faces of the soil sample will be supplied by a single output means and will be equal.

Force-applying means 111 may be used as a supplement to the force-applying means 73. The force-applying means 111 includes a base plate 113, a cylinder 115, a piston 117 slidably mounted in the cylinder, a force-applying rod 119, and a roller 121 carried by the rod. The base plate 113 rests on the triangular mounting plate 59 and the roller 121 engages the lower side of the support plate 55. Pressure is supplied by a second pump 122 to the lower face of the piston 117, thereby tending to extend the force-applying means 111 and exerting through the rods 61 a downwardly directed force on the load distribution plate 57. The force applied by the force-applying means 111 is generally different from the force applied by the force-applying means 73. The base plate 113 is fixed to the mounting plate 59 and the force exerted by the force-applying means 111 is absorbed equally by each of the supporting units 109, because of the central location of the force-applying means 111.

The total stress in the three supporting units 109 is always equal to the pressure applied by the force-applying means 73 when no pressure is applied by force-applying means 111. Generally, the pressure applied by force-applying means 73 is kept constant as it is moved about the plates 53 and 57. However, in some tests it is desirable to increase the average pressure in the supporting units 109 during a test when the force-applying means 73 is no longer at the centroid of the plate 57. If at this stage the pressure in the force-applying means 73 alone were to be increased both the average pressure and the shearing stresses in the test specimen would be increased. When the shearing stress increase is not desired, the average pressure increase can be accomplished by increasing the pressure in the force-applying means 111 since it acts through the plate center.

The stress control device may also be used as an analog computer. By way of illustration the following paragraphs describe how the device can be used to solve certain equations in connection with the testing of soil samples.

The three principal stresses $\sigma_1$, $\sigma_2$, and $\sigma_3$ at a point in a solid are given by the roots of the equation $$\sigma^3 - J_1\sigma^2 + J_2\sigma - J_3 = 0 \qquad (1)$$

which can be rewritten in the form $$\sigma'^3 + J_2'\sigma' - J_3' = 0 \qquad (2)$$

where $$\sigma' = \sigma - J_1/3 \qquad (3)$$

and $$J_2' = 1/3(3J_2 - J_1^2) \qquad (4)$$

$$J_3' = \frac{1}{27}(2J_1^3 - 9J_1J_2 + 27J_3) \qquad (5)$$

The three roots are:

$$\sigma_1 - J_1/3 = \sigma_1' = 2\sqrt{\frac{-J_2'}{3}} \cos\frac{\phi}{3} \qquad (6)$$

$$\sigma_2 - J_1/3 = \sigma_2' = 2\sqrt{\frac{-J_2'}{3}} \cos\left(\frac{\phi}{3} + 120°\right) \qquad (7)$$

$$\sigma_3 - J_1/3 = \sigma_3' = 2\sqrt{\frac{-J_2'}{3}} \cos\left(\frac{\phi}{3} + 240°\right) \qquad (8)$$

where $$\cos\phi = \frac{3J_3'}{2\sqrt{\frac{-J_2'^3}{3}}} \qquad (9)$$

In general it is desired to obtain the roots $\sigma_1$, $\sigma_2$ and $\sigma_3$ of the Equation 1 when $J_1$, $J_2$ and $J_3$ are given. This is accomplished by first calculating $J_2'$, $J_3'$ and $\phi$ from Equations 4, 5 and 9, respectively.

The values of these parameters are then inserted in the stress control device as follows. The pressure in the force-applying means 73 is set at a value equal to $J_1$ to some convenient scale, and the force-applying means 73 is placed at a point P in FIG. 8. In FIG. 8 the distance OP is made equal to $(-2J_2)^{1/2}$ and the angle between OP and the reference axis Ox is made equal to $\phi/3$ where $\phi$ is given by Equation 9. The pressures in the three supporting units 109 below the plate 57 are then equal to the three required roots $\sigma_1$, $\sigma_2$ and $\sigma_3$ of Equation 1 to the appropriate scale. Of course pressure gages or other suitable means may be employed to measure these three pressures.

It is apparent therefore that the stress control device of this invention accurately divides an input force into a plurality of equal or different output forces. Although the stress control device is particularly adapted for use with the soil testing device 11, it will be apparent that it has many other uses. More than three outputs may be provided by using more than three of the supporting units 109 preferably arranged so that each of them will be on the corner of a polygon.

Many changes, modifications, and substitutions may be made by one having ordinary skill in the art without necessarily departing from the spirit and scope of this invention.

What is claimed is:

1. In a stress control device, the combination of:
   a load distribution plate having first and second opposed faces;
   a frame including mounting means for mounting said load distribution plate for movement in a direction generally perpendicular to said faces;
   force-applying means for applying an input load to said load distribution plate at a single location, said force-applying means being movable to apply said load to said load distribution plate at any one of a plurality of different locations thereon, said force-applying means being variable to apply an input load of controlled magnitudes; and
   at least three spaced output units mounted in said frame and engageable with said second face for supporting said load distribution plate and said input load, the points of engagement between said output units and said load distribution plate being disaligned to provide support for said load distribution plate at least at three laterally disaligned points, said input load being applied within the figure defined by said output units and being distributed by said load distribution plate to said output units, the proportioning of said input load on said output units being controllable by moving said force-applying means, each of said output units including output means for producing an output pressure load variable in response to the position of an input load applied by said force-applying means,
   whereby each of said output units produces an output pressure varying as a function of the magnitude of the input load and varying with respect to the other output pressures as a function of the location of the input load at said load distribution plate.

2. A combination as defined in claim 1 wherein means are provided on said load distribution plate for accurately positioning said force-applying means at a plurality of spaced points on said load distribution plate.

3. A combination as defined in claim 1 wherein three of said output units are provided, said three output units being equally spaced and arranged so that said points of engagement form the apices of an equilateral triangle.

4. A combination as defined in claim 1 wherein each of said output means includes a pressure-responsive piston and cylinder combination, and each of said output units includes a rod engageable with said second face of said load distribution plate and the piston of the respective output unit.

5. A combination as defined in claim 1 wherein said load distribution plate is generally flat and a support plate is rigidly mounted in spaced relationship to and facing said second face of said load distribution plate, said output units being supported by said support plate and sandwiched between said plates.

6. A combination as defined in claim 1 wherein said load distribution plate is generally flat, a support plate is rigidly secured to said mounting means in spaced relationship to and facing said second face of said load distribution plate, said output units being supported by said support plate and sandwiched between said plates, and each of said output means includes a pressure-responsive piston and cylinder combination, said piston and cylinder being movable relative to each other in response to said load to produce said output.

7. A combination as defined in claim 1 wherein said load distribution plate is generally flat, a support plate is provided rigidly mounted in spaced relationship to and facing said second face of said load distribution plate, said output units being supported by said support plate and sandwiched between said plates, said force-applying means includes a mounting member spaced from said support plate on the side thereof remote from said load distribution plate and supported by said load distribution plate and extendable means between said mounting member and said support plate for applying said input load to said load distribution plate.

8. A combination as defined in claim 1 wherein parallel guide tracks are provided on said first face of said load-distribution plate for engaging said force-applying means and accurately positioning the latter on said first face.

9. A combination as defined in claim 1 wherein said load distribution plate is generally flat and triangular, said mounting means includes three generally vertical guide posts positioned respectively adjacent the apices of said load distribution plate and mounting said load distribution plate for generally vertical movement, and said load distribution plate is supported adjacent each of said apices by said output units.

10. A combination as defined in claim 1 including:
    a test cell for receiving a test specimen and having pressure means for applying a load to a specimen along at least three different directions; and
    means for connecting each of said output means to corresponding pressure means of said test cell in specimen loading relation to apply compressive pressure to a specimen.

11. A combination as defined in claim 10 wherein said test cell includes a substantially fluid tight body having a cavity therein for receiving a test specimen, and each of said output means includes a fluid pump for producing the output load for said pressure means.

12. In a stress control device, the combination of:
    a load distribution member having first and second opposed faces;
    a plurality of posts;
    means for mounting said member on said posts for movement therealong;
    force-applying means for applying an input load to said load distribution member at a single location, said force-applying means being movable to apply said load to said member at any one of a plurality of different locations, said force-applying means being variable to apply an input load of controlled magnitude;
    guide means on said load distribution member for accurately positioning said force-applying means;
    a support member rigidly secured to said posts, said support member being in spaced relationship to and facing said second face of said load distribution member; and a plurality of spaced output units supported by said support member and engageable with said second face for supporting said load distribution member and said input load, said input load being applied within the figure defined by said output units and being distributed by said member to said output units, the proportioning of said input load on said output units being controllable by moving said force-applying means, each of said output units including output means for producing an output pressure variable in response to the position of an input load applied by said force-applying means, whereby each of said output units produces an output pressure varying as a function of the magnitude of the input load and varying with respect to the other output pressures as a function of the location of the input load at said load distribution member.

13. In combination:
a load distribution member;
means for mounting said member for movement;
force-applying means for applying an input load to said member at any one of a plurality of different locations;
a plurality of output units spaced over and engageable with said member for supporting said member and said input load, said input load being distributed by said member to said output units, each of said output units including output pump means for producing a fluid pressure output variable in response to the amount of load carried by its respective output unit;
a substantially fluid-tight body having a cavity therein for receiving a soil sample; and
means in said body responsive to the fluid pressure output of each of said output pump means for applying independent compressive forces along different directions to the soil sample within the cavity.

14. A combination as defined in claim 13 wherein said last-mentioned means includes a plurality of resilient diaphragms within said cavity and forming therewith a plurality of fluid-tight chambers, said chambers being expandable in response to corresponding fluid pressure outputs to apply said compressive forces to the soil sample in the cavity.

15. In a testing apparatus for pressurizing a test specimen, the combination of:
force-producing means;
output pump means responsive to said force-producing means for producing three variable fluid pressure outputs;
means disposed between said force-producing means and said output pump means for distributing the force of said force-producing means to said output pump means in a controlled relation;
a test container for pressure testing the test specimen; and
means within said test container responsive to each of said three fluid pressure outputs for applying a pressure to the test specimen along each of three generally perpendicular axes, said last mentioned means including expansible means adjacent the walls of said container and expansible in response to the fluid pressure generated by each of said output pump means, whereby application of a force by said force-producing means generates variable compressive forces within said test container to compress the specimen on three mutually perpendicular axes.

References Cited

UNITED STATES PATENTS

| 2,430,702 | 11/1947 | Bohawnan | 177—209 |
| 2,457,655 | 12/1948 | Gifford | 177—209 |
| 2,489,904 | 11/1949 | Kratzer | 73—94 |
| 2,795,953 | 6/1957 | Makowsky | 73—172 |

FOREIGN PATENTS

| 39,988 | 7/1957 | Poland. |
| 151,855 | 12/1961 | Russia. |
| 156,331 | 11/1963 | Russia. |
| 256,006 | 3/1949 | Switzerland. |
| 321,492 | 6/1957 | Switzerland. |

RICHARD C. QUEISSER, *Primary Examiner.*

J. H. WILLIAMSON, *Assistant Examiner.*

U.S. Cl. X.R.

73—84; 100—211